Oct. 25, 1949. F. M. CLARK ET AL 2,486,116
ELECTRIC CAPACITOR
Filed Oct. 5, 1945
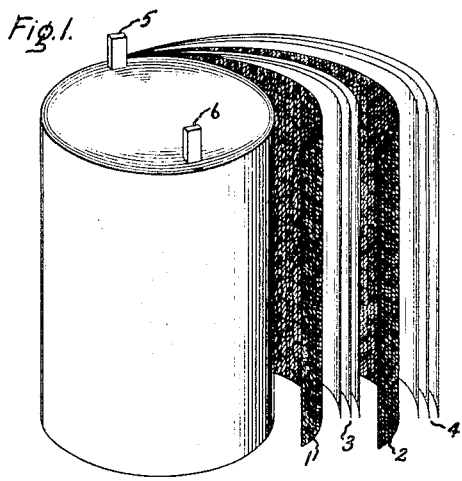
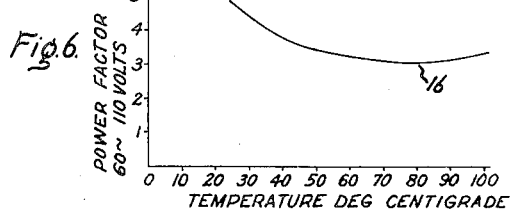
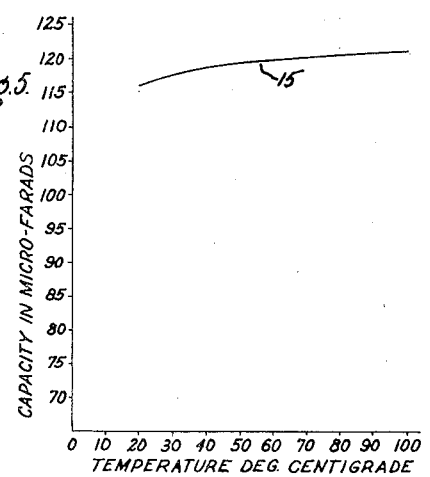
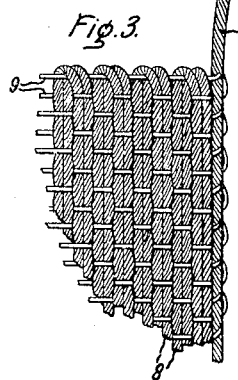
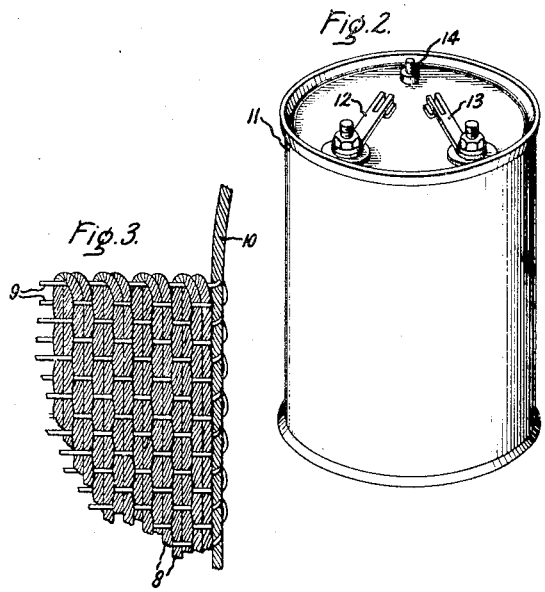
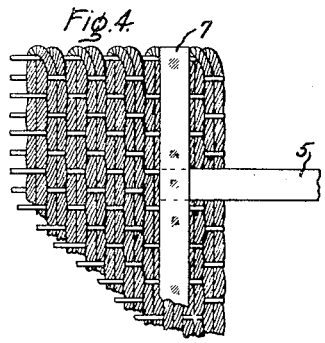
Inventors:
Frank M. Clark,
Goldner F. Lipsey,
by Harry E. Dunham
Their Attorney.

Patented Oct. 25, 1949

2,486,116

UNITED STATES PATENT OFFICE 2,486,116

ELECTRIC CAPACITOR

Frank M. Clark and Goldner F. Lipsey, Pittsfield, Mass., assignors to General Electric Company, a corporation of New York Application October 5, 1945, Serial No. 620,586

7 Claims. (Cl. 175—315)

The present invention comprises electric capacitors containing armatures made up of spun metal threads or yarn and suitable cooperating parts, and in particular relates to the electrolytic type of capacitors.

Capacitor armatures or electrodes comprising component filaments which are oriented systematically as in woven fabrics possess advantages over capacitor armatures made up of powders or non-oriented shredded material which is arranged by chance and in that state compacted under pressure to form rigid coherent bodies.

The latter have serious disadvantages. Although electrodes consisting of compacted non-oriented material have a large surface area per unit of volume and provide numerous interstices, the amount of material compacted into an electrode structure of practicable size, such as a cylinder or a plate, necessarily is small because of limitations imposed by the plan area of the container. It would be necessary to combine a number of such units in order to secure a required area of electrode surface. The result would be an awkward, bulky capacitor structure, the space requirements of which defeat its object. The energy losses and power factor characterizing the operation of capacitors provided with armatures made in this way are higher than that of electrolytic capacitors having conventional foil armatures. The resistance of such molded capacitor armatures and their power factors are too high for efficient operation particularly when the molded armatures have a thick cross-section.

Electrolytic capacitors embodying armatures of the herein-termed woven type which resemble textile fabrics are operable with relatively low power factors, that is, power factors not higher than about five per cent at room temperature. The power factor of capacitors embodying such armatures surprisingly decreases with rise of operating temperature. Their capacity per unit weight increases with rise of operating temperature. The total capacity of capacitor assemblies containing such armatures can be readily increased by increasing the area of the woven armatures without the necessity of joining together separate units. For example, the area of an armature can be readily increased by lengthening it, and resulting elongated strip may be coiled on itself in a capacitor assembly. Space thus is economized, and a compact, convenient capacitor structure results.

In the accompanying drawing Fig. 1 shows a capacitor assembly partly unrolled; Fig. 2 is a front elevation of a completed capacitor; Figs. 3 and 4 show structural details and Figs. 5 and 6 are graphs of operating characteristics.

For the preparation of the fibers employed for the production of woven fabrics embodying my invention I may employ metallic wool which is prepared by the apparatus and method described in United States Letters Patent 2,297,368, Rippl and Isaac, assigned to the same assignee as the present application, the following example being given for illustrative purposes.

In the preparation of yarn for fabricating capacitor electrodes in accordance with my invention metal foil consisting of film-forming metal such as aluminum, magnesium, or alloys of these metals is shredded into fine filaments by suitable apparatus such as shown in this patent. For example, aluminum foil having a thickness of about .0005 inch or less is cut into rectangular ribbons or filaments having a width of about .001 inch or less, thereby forming a metallic wool capable of being spun into yarn. When a textile product intended for electrode purposes in electrolytic capacitors is to be made, it is preferred that an aluminum wool should be chosen which has a purity as high as 99 per cent or higher.

Bundles of resulting metallic wool are spun or twisted into yarn by methods employed in the textile industry. In some cases a minor proportion of cotton, or other cellulosic fiber, may be associated with the metallic wool to give increased strength during the manufacture of the thread. The cellulosic fibers preferably are later removed when annealing the yarn or finished cloth at temperatures in the range of about 400° to 500° C.

The resulting yarn either consisting wholly of film-forming metallic wool, or comprising if desired in part cellulosic fiber, is woven to form a web by methods employed in textile manufacture. Both the warp and woof of the web may be constituted of such metallic yarn or threads of other textile fibers or metallic wires may be substituted for either the warp or the woof. Depending on the thickness of the metal foil used, and on the fineness of the cut width of the foil, the finished woven textile may be obtained in various thicknesses and as low as 15 or 20 mils. In some cases we prefer for reasons of utility to prepare a thicker product. Thicknesses in the range from 25 or 30 mils appear most practical.

For a fabric intended for electrode purposes in electrolytic capacitors, spun yarn of film-forming wool ordinarily is used for both the warp and the woof. With such armature construction which is indicated at 1 and 2 in Fig. 1, we obtain the greatest electrical capacity per unit capacitor volume. The armatures 1, 2 are separated by spacers 3, 4 of paper or textile fabric. Electrolytic capacitors prepared with such electrodes are characterized by capacity gains of as high as 40 or 50 fold as compared with capacitors containing plane surfaced foil. The power factor of the finished electrolytic capacitor is approximately 5% or less.

Such capacitors have good dielectric stability when prepared with a properly selected electrolyte of relatively high conductivity and low viscosity. When operated intermittently at 110 volts alternating current at 70° C. or heated at 100° C. without voltage, the capacitor shows a dielectric stability entirely suitable for commercial use, for example as motor starting capacitors for refrigerators or pumps, or fan motors. Equally good dielectric stability is observed when a suitably prepared electrolytic capacitor containing this type of electrode is operated on direct current voltage circuits.

In capacitors utilizing woven web electrode consisting entirely of spun metallic threads as described, electrical connections to the electrodes may be made in the usual manner by the use of laid-in tap straps 5, 6 consisting of aluminum foil. Preferably, however, in order to obtain the best electrical contact (i. e. lower tap strap contact resistance) the electrical connection to the electrode is made by pressing an aluminum foil tap strap 7 tightly over one end of the woven electrode or over the middle of the electrode, as shown in Fig. 4. Pressure contact has been found satisfactory. If desired the tap may be spot-welded to the electrode as indicated in Fig. 4 to make a firmer contact.

For some commercial alternating current voltage applications it is desired that the capacitor power factor shall be lower than 5%, values as low as 3% being desired. In such cases, we prefer that the woven electrodes should be made as shown in Fig. 3, the spun yarn 8 of aluminum wool or the like being the woof and fine aluminum wires 9 being the warp. As shown in this figure the ends of the wires 9 may be twisted together to form a conductor 10 which is connected to the external contacts 5, 6. With this arrangement better electrical conductivity, that is lower resistance, is obtained throughout the length of the woven electrode. The power factor of such a capacitor utilizing the electrode arrangement comprising the spun yarn and the aluminum wire in conjunction with a properly selected, highly conducting electrolyte in general is about three per cent, and possesses highly satisfactory dielectric stability on intermittently applied alternating current voltage or on direct current circuits under environmental temperatures as high as 100° C. Although the diameter of the wires 9 is not critical, we have found wires of .012 inch diameter to be satisfactory. A suitable electrode may have eight aluminum wires per inch as the warp and twenty-six strands per inch of aluminum spun yarn as the woof. Electrodes thus prepared having a length of 7¾ inches and width of 1⅞ inches have a weight of about 10.5 grams.

For the purpose of illustrating a specific advantageous application of our invention, the following subsequent treatment is described as suitable for the preparation of electrolytic capacitors from a pressed woven fabric prepared from yarn of aluminum wool. Other methods of treatment, however, may be employed.

The woven electrodes after being washed with distilled water are annealed by heating to about 450° C. for one hour. They may be pressed after annealing to remove thickness inequalities, suitable pressures being 1000 to 2500 pounds per square inch. Electrodes thus prepared having substantially plane surfaces are treated to produce a current-blocking film thereon, for example, by being anodized with a direct current of 180 volts in an aqueous solution of a suitable ionogen, for example, a 10 to 15 per cent aqueous solution of ammonium carbonate. Anodic treatment is continued until the current falls to less than .01 ampere per unit of surface corresponding to one microfarad of capacity. After washing and drying, the electrodes are heat-treated at 450° C. for about one hour. The electrodes then are reoxidized at the same voltage in an electrolyte, such, for example, as the carbonate solution originally used.

Oxidized electrodes prepared as described are assembled with suitable spacers, for example, with spacers consisting of one or two sheets of .0035 inch chloride-free cotton gauze and one sheet of chloride-free paper of the kind commonly employed in electrolytic capacitors. If desired, the spacer may consist entirely of the gauze or may consist of a highly absorbent paper of the type heretofore used in electrolytic capacitors. A combination of three sheets of .001 inch highly absorbent electrolytic tissue (density about .5) has been found suitable as spacers.

A suitable electrolyte for use in electrolytic capacitors containing the woven type armatures is a solution of succinic acid in ethylene glycol (e. g. 13 per cent solution) which has been treated by passage of ammonia gas to a pH greater than six and preferably about seven. An electrolyte of low viscosity and low resistance should be chosen. An electrolyte of not more than 300 ohms-cm. at 25° C., and preferably as low as 150 to 250 ohms-cm. is satisfactory. The viscosity should be less than 300 seconds Saybolt Universal at 25° C. and preferably in the range from 125–175 seconds. The electrolyte described has a resistance as normally prepared of about 200–250 ohm-cm. and a viscosity of 158 seconds Saybolt Universal.

After treatment by immersion in the electrolyte, preferably for about one hour at a temperature in the range from 50 to 100° C. the capacitor assembly is freed from excess electrolyte as by draining. The assembly may be rendered liquid-impervious by being wrapped in cellulose acetate sheets or by dipping in a suitable resin. Finally the capacitor assembly is sealed with a waterproof asphalt. The wrapping or dip-coating protects the assembly against entrance of the asphalt. The coated assembly of capacitor elements may be placed in a suitable container 11, Fig. 2, the tap straps or conductors 10 being connected to terminals 12, 13. A conventional nozzle 14 providing a breather orifice has been indicated.

A typical capacitor assembly has a capacity of about 117 microfarads at room temperature (25° C.) and a power factor of five per cent or less as previously indicated. The capacity rises somewhat with rise of temperature as shown by the graph 15 of Fig. 5. At 75° C. the capacity rises to about 120 microfarads. As shown by the graph 16 of Fig. 6, the power factor decreases with rise of temperature. At an operating temperature of 75° C. the power factor is about 3 per cent.

What we claim as new and desire to secure by Letters Patent of the United States is:

1. A capacitor electrode consisting of a weave of yarn made of aluminum wool, the individual filaments of which have maximum dimensions of about .001 inch by .0005 inch.

2. A capacitor structure consisting of a woven fabric made of yarn consisting of filaments of aluminum, which have maximum dimensions of about 0.001 inch by 0.0005 inch, associated with textile filaments which are capable of being removed by subjecting said structure to heat treatment at a temperature of about 400 to 500° C.

3. An armature adapted for use in electrolytic capacitors consisting of a woven web, the woof of which comprises yarn made up of fine rectangular filaments of aluminum, said filaments having a cross section one dimension of which is not greater than 0.001 inch and is not greater than twice the other dimension, and the warp of which comprises aluminum wires of greater diameter than the larger dimension of said filaments, the projecting ends of said wires being united to form a current conveying terminal for said armature.

4. An electrolytic capacitor comprising the combination of spaced cooperating woven armatures comprising spun rectangular film-forming metal ribbon material, having a thickness not more than about 0.0005 inch and a width not more than about 0.001 inch and an electrolyte having a viscosity of less than 300 seconds Saybolt Universal at 25° C. and being characterized by an electrical resistivity of from about 150 to 300 ohm-cm. at 25° C.

5. An electrolytic capacitor comprising the combination of spaced cooperating woven armatures of spun rectangular aluminum ribbon material having a thickness not more than about 0.0005 inch and a width not more than about 0.001 inch and an electrolyte having a viscosity of less than 300 seconds Saybolt Universal at 25° C. and an electrical resistivity of from about 150 to 300 ohm-cm. at 25° C.

6. An electrolytic capacitor comprising the combination of spaced cooperating woven armatures comprising spun aluminum ribbon material having a thickness not more than about 0.0005 inch and a width not more than about 0.001 inch and an electrolyte consisting of a solution of succinic acid in ethylene glycol, said electrolyte having a pH of about 6 to 7.

7. An electrolytic capacitor comprising the combination of spaced cooperating woven armatures comprising spun flat filaments of film-forming metal, each of said flat filaments having a thickness of not more than about 0.0005 inch and a width of not more than about 0.001 inch, spacers of absorbent material separating said armatures, and an electrolyte having a viscosity at 25° C. of less than 300 seconds Saybolt Universal and an electrical resistivity of from about 150 to 300 ohm-cm. at 25° C.

FRANK M. CLARK.
GOLDNER F. LIPSEY.

REFERENCES CITED

The following references are of record in the file of this patent:

UNITED STATES PATENTS

| Number | Name | Date |
| --- | --- | --- |
| 479,753 | Colgate | July 26, 1892 |
| 514,267 | Legay | Feb. 6, 1894 |
| 1,192,219 | Montgomery | July 25, 1916 |
| 1,584,747 | Lewis | May 18, 1926 |
| 1,907,124 | Ruben | May 2, 1933 |
| 1,918,716 | Ruben | July 18, 1933 |
| 2,042,044 | Garstang | May 26, 1936 |
| 2,052,575 | Lilienfeld | Sept. 1, 1936 |
| 2,199,446 | Ruben | May 7, 1940 |
| 2,297,607 | Blackburn | Sept. 29, 1942 |
| 2,299,667 | Waterman | Oct. 20, 1942 |
| 2,321,997 | Compton | June 15, 1943 |
| 2,355,788 | Dunleavey | Aug. 15, 1944 |
| 2,361,378 | Brennan | Oct. 31, 1944 |

FOREIGN PATENTS

| Number | Country | Date |
| --- | --- | --- |
| 440,366 | Great Britain | Dec. 30, 1935 |